United States Patent [19]
Onstott et al.

[11] Patent Number: 4,588,256
[45] Date of Patent: May 13, 1986

[54] OPTICAL FIBER CONNECTOR

[75] Inventors: James R. Onstott, Beldenville, Wis.; Bryon J. Cronk, Hugo; Thomas M. Cherney, St. Paul, both of Minn.

[73] Assignee: Minnesota Mining ar Manufacturing Com ny, St. Paul, Minn.

[21] Appl. No.: 724,804

[22] Filed: Apr. 19, 1985

Related U.S. Application Data

[63] Continuation of Ser. No. 415,224, Sep. 7, 1982, abandoned.

[51] Int. Cl.⁴ ................................................. G02B 6/38
[52] U.S. Cl. ................................................. 350/96.21
[58] Field of Search ................ 350/96.20, 96.21, 96.22

[56]  References Cited
U.S. PATENT DOCUMENTS

| | | | |
|---|---|---|---|
| 4,019,241 | 4/1977 | Logan | 29/407 |
| 4,050,781 | 9/1977 | Beauhaire | 350/96 C |
| 4,061,416 | 12/1977 | Stewart | 350/96 C |
| 4,094,580 | 6/1978 | Cook et al. | 350/96.21 |
| 4,148,554 | 4/1979 | Magnusson et al. | 350/96.21 |
| 4,201,443 | 5/1980 | Hodge | 350/96.20 |
| 4,405,200 | 9/1983 | Hoffmann et al. | 350/96.21 |
| 4,496,213 | 1/1985 | Borsuk | 350/96.21 |

*Primary Examiner*—William L. Sikes
*Assistant Examiner*—Robert E. Wise
*Attorney, Agent, or Firm*—Donald M. Sell; James A. Smith; William B. Barte

[57] ABSTRACT

A connector for an optical fiber cable is disclosed wherein strain relief features are provided for minimizing strain applied either to the external jacket of the cable or to the fiber such as during connecting operations is prevented from being coupled to the optical fiber. The connector thus includes strain relief members for securely anchoring the outer jacket of the cable and for anchoring strain relief fibers contained within the cable. Also, a resilient member is provided for allowing limited rearward movement of a member within which the optical fiber is anchored such as may occur during connection.

14 Claims, 2 Drawing Figures

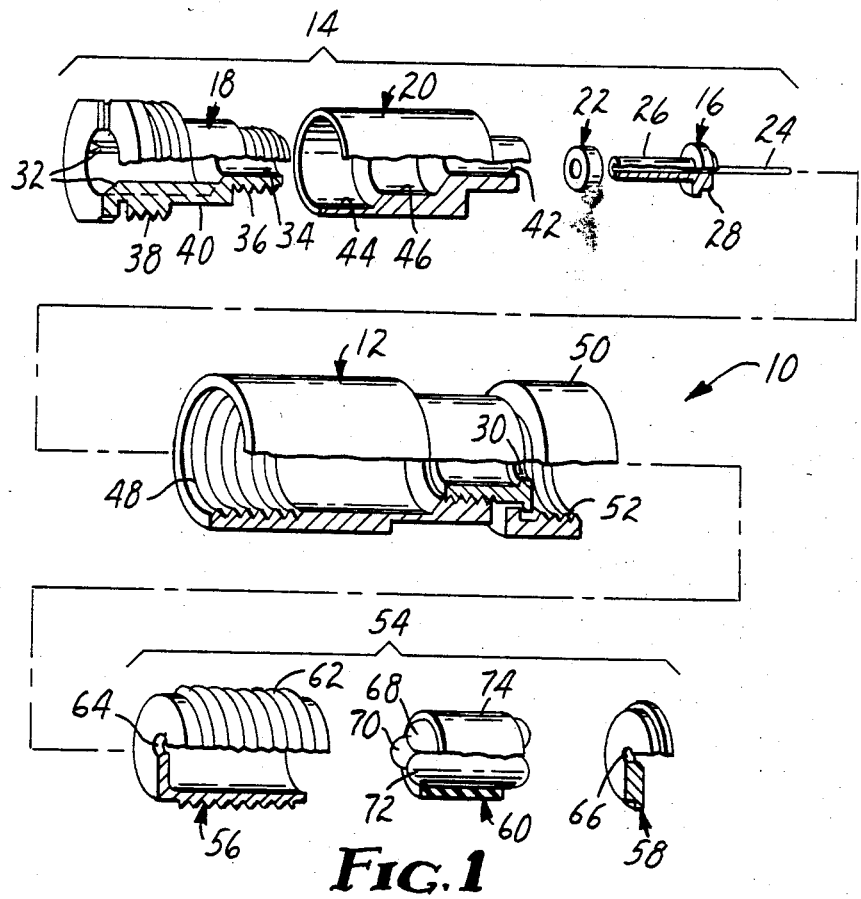
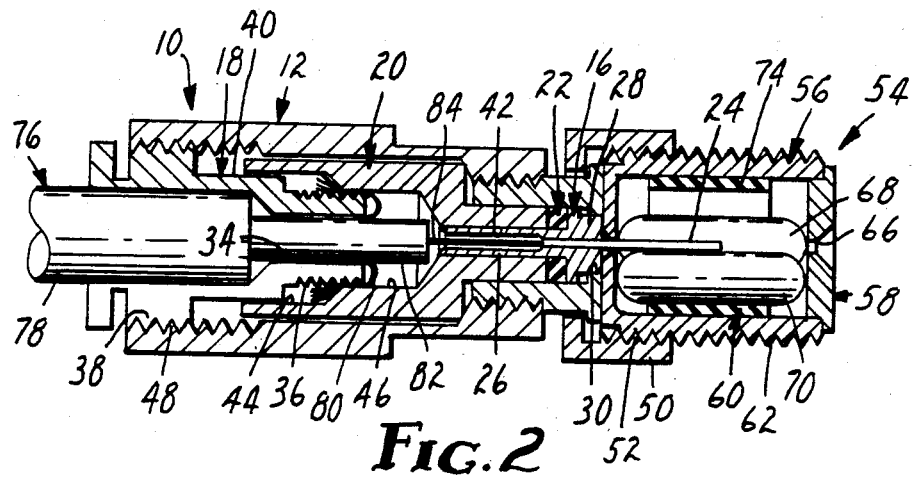

OPTICAL FIBER CONNECTOR

This is a continuation of application Ser. No. 415,224 filed Sept. 7, 1982, abandoned.

BACKGROUND OF THE INVENTION

1. Field of the Invention

This invention relates to fiber optic connectors, and in particular to such connectors adapted for use with cables including a single optical fiber, a layer of braided, high strength fibers, and a polymeric outer jacket.

2. Description of the Prior Art

In the evolution of fiber optic technology, particularly as applied to communications applications, a large variety of connector types have been designed, many of which are primarily directed to minimizing signal losses at the interface between the mated optical fibers due to misaligned or improperly separated fibers.

With respect to the fiber alignment problem, for example, it is known to anchor the end of the small diameter, fragile optical fiber to be connected within a short length of a precisely dimensioned metal tube such as is typically used in hypodermic needles, the ends of the fiber being coplanar with or slightly recessed within the tube. In such a technique, the tube containing the fiber is then maintained in optical alignment with a like member within a closely dimensioned sleeve or channel, such as provided by another metal tube of appropriate inner diameter. See, for example, U.S. Pat. Nos. 4,148,554 (Magnusson & Cronk) and 4,291,943 (Binek et al). The tube thus both protects the optical fiber from undue stress and maintains the inter-fiber gap upon repeated connecting operations.

In lieu of a single sleeve or other channel providing member such as is used to align and connect tubes having optical fibers anchored therein, as in the patents noted above, it is also known to provide a bundle of cylindrical rods disposed in a side-by-side array parallel to each other with longitudinal peripheral surface portions of adjacent members forming a cusp-shaped interstitial channel therebetween, within which optical fibers may be secured in optical alignment. See, for example, U.S. Pat. No. 4,201,443 (Hodge). A similar array of cylindrical rods is utilized in a method for permanently splicing optical fibers depicted in U.S. Pat. No. 4,019,241 (Logan). U.S. Pat. Nos. 4,061,416 (Stewart), 4,050,781 (Beauhaire), and 4,094,580 (Cook et al) disclose further examples of optical fiber connectors in which cylindrical rod assemblies are used directly against the optical fiber. In the latter cases, stress due to compressive loading on the cylindrical rods is often coupled to the fragile optical fiber. Also, the various designs typically require the fabrication of complicated connector housings which are difficult to terminate outside of a controlled environment and are, therefore, virtually useless in applications where the connectors must be installed on optical fiber cables in the field of ultimate use.

SUMMARY OF THE INVENTION

In contrast to the complex and expensive prior art connectors discussed above, the connector of the present invention, adapted for optically coupling a cable containing a single optical fiber, utilizes simple, inexpensive components to achieve high performance, i.e. low signal loss, even after repeated connections and disconnections. The present connector particularly includes components for controlling stress such as may be applied to an optical fiber cable during connecting and disconnecting operations and can be easily installed under adverse conditions in the field.

The connector is particularly intended for coupling an optical fiber cable which includes an outer jacket, a plurality of strain relief fibers, and an innermost optical fiber. The connector comprises a housing and a strain relief assembly adapted to be first assembled onto an optical fiber cable and then inserted into the housing. The housing thus has a generally cylindrical cavity extending along an axis therein and includes rear and front openings concentric with the axis. The rear opening is adapted to receive the strain relief assembly in axial alignment, and the front opening is adapted to allow a portion of the strain relief assembly to protrude therethrough.

The strain relief assembly of the connector is in turn made up of a number of interconnecting components, including an optical fiber mounting means, a rear strain relief member, a front strain relief member, and a resilient member adapted to fit between the fiber mounting means and the front strain relief member. The optical fiber mounting means forms the forward-most component and includes a tubular member, such as a precision metal tube, for receiving and anchoring therein an optical fiber. Preferably, the tube contains a hot-melt adhesive which upon heating allows the fiber to be inserted therethrough, and upon cooling, to be anchored therein, allowing it to be polished and slightly recessed behind the end of the tube, as set forth in U.S. Pat. No. 4,148,554. The rear portion of the fiber mounting means and the front portion of the front strain relief member are adapted to be axially interconnected, the resilient member, such as an elastomeric ring, being fitted therebetween to allow limited rearward axial movement of the mounting means when movement of the front strain relief member is constrained, such as by the outer housing.

The opposite, or rear-most, component of the assembly is the rear strain relief member, which member has a generally axially symmetric opening therethrough for axially receiving an optical fiber cable at the rear end and includes means for anchoring the outer jacket of the cable, while the remainder of the cable is allowed to pass therethrough.

Finally, the front strain relief member forms the center member of the assembly, and has an axially symmetric opening extending therethrough adapted at the front end for receiving and axially supporting the rear portion of the fiber mounting means as noted above, and adapted at the rear end for receiving and axially supporting a front portion of the rear strain relief member. The front strain relief member also includes means for cooperating with matching means in the rear strain relief member for receiving and anchoring therebetween the strain relief fiber of the cable, the two members preferably also including interconnecting detent means for providing a positive indication when the two members are fully engaged.

Installation of the connector of the present invention on the end of an optical fiber cable thus proceeds as follows: The respective components of the cable are sequentially stripped back, leaving a portion of exposed optical fiber at one end, and with the strain relief fibers preferably protruding slightly beyond the end of the outer jacket. The sequentially stripped back members are then inserted into the rear portion of the rear strain relief member, with the outer jacket becoming anchored therein while the remaining components of the cable extend therethrough. The strain relief fibers are next folded back over the periphery of the rear strain relief member, and that member is inserted into the front strain relief member, securing the strain relief fibers therebetween. The final step in the installation of the strain relief assembly includes sliding the resilient member and the optical fiber mounting means over the exposed fiber end and anchoring the optical fiber within the tubular member such that the resilient member bears against the front strain relief member. The completed assembly is then secured within the outer housing such that the tubular member and fiber anchored therein extends through an opening in the housing to allow optical coupling thereto.

In a further embodiment, the connector is desirably mated with a fiber alignment assembly which aligns the tubular member containing the anchored optical fiber with a like tubular member containing another optical fiber. In such an embodiment, the alignment assembly includes an enclosure adapted for mating with the connector housing, and fiber guiding means therein which forms a channel into each end of which the respective tubular members may be inserted such that they meet at a mid-point, thus optically coupling the respective fibers contained therein. The fiber guiding means includes at least three elongated members disposed within the enclosure in a side-by-side array parallel to each other, with longitudinal surface portions in contact with each other, a cusp-shaped interstitial channel thus being formed therebetween. A resilient band is also included about the elongated members for biasing them toward the channel while also allowing for slight radial expansion of the channel upon receipt of at least one tubular member therein.

The strain relief assembly of the instant connector thus allows limited axial rearward movement of the fiber mounting means and prevents undue strain on the optical fibers mounted therein, such as may occur upon contact of the tubular member with a similar member within the channel in the fiber alignment assembly. Similarly, external forces applied to the outer jacket are enabled to be transferred to the assembly via the anchored outer jacket and anchored strain relief fibers, and prevents such forces and associated strains from being coupled to the optical fiber. Also, the rearward axial movement afforded the tubular member and contained optical fiber eliminates requirements present in prior art connectors that the length of the optical fiber protruding from the housing be precisely controlled.

BRIEF DESCRIPTION OF THE DRAWING

FIG. 1 is a partially cut-away perspective view of the various components comprising a preferred embodiment of the present invention; and FIG. 2 is a sectional view of the components shown in FIG. 1, in assembled form, together with an optical fiber cable.

DETAILED DESCRIPTION

As shown in the exploded view of FIG. 1, a preferred embodiment of the present invention includes a connector 10 which comprises an outer housing 12 and a strain relief assembly 14. The strain relief assembly 14 in turn is made up of an optical fiber mounting means 16, a rear strain relief member 18, a front strain relief member 20, and a resilient member 22. As described in more detail hereinbelow, an optical fiber cable would be fitted onto the connector from the left end thereof such that an optical fiber within the cable would be received and anchored within the optical fiber mounting means 16. That means thus further includes a tubular member 24 having an internal dimension slightly greater than that of the optical fiber to be anchored, such that the fiber is maintained in axial alignment therein. The tubular member 24 is in turn secured in a rear projecting cylindrical member 26, having a larger internal diameter to facilitate entry of the optical fiber therein, both members of which are retained within an axially concentric flange 28 appropriately dimensioned to be secured within a front opening 30 of the housing 12. The rear projecting member 26 and flange member 28 may desirably be machined from a single section of brass, into which may be press fitted a stainless steel tube which forms the tubular member 24. To facilitate the anchoring of an optical fiber within the member 24, that member is desirably filled with an injection loaded hot melt adhesive. When so provided, as described in more detail hereinafter, the mounting means 16 may be inserted into a heatable jig, thus liquefying the adhesive, and enabling the optical fiber to be inserted therein. After the insertion, the mounting means 16 is removed from the jig, allowing the adhesive to solidify, thereby anchoring the fiber.

The rear strain relief member 18 is further shown in FIG. 1 to include a generally cylindrical shell having a generally axially concentric opening 34 therethrough for receiving an optical fiber cable at the left, or rear end thereof. The shell includes a plurality of longitudinal ridges 32 extending along the opening therethrough, which are adapted for bearing against the outer jacket of the optical fiber cable to anchor the jacket therein. The front portion of the opening 34 is of a slightly reduced diameter, such that only the inner portions of the optical fiber cable are allowed to pass therethrough. The outer periphery of the rear strain relief member includes a front portion 36, a rear portion 38, and a center portion 40. The front portion 36 includes a number of ribs adapted for cooperating with matching means in the front strain relief member 20 to anchor therebetween strain relief fibers of an inserted optical fiber cable. Finally, the rear portion 38 of the rear strain relief member is provided with threads about the periphery for enabling the entire strain relief assembly to be threaded into the outer housing 12. As will be appreciated by one of ordinary skill in manufacturing techniques, the rear strain relief member 18 may be conveniently machined, such as from brass, or molded via conventional injection molding techniques.

The front strain relief member 20 is further shown in FIG. 1 to include an axially symmetrical opening therethrough, the front end 42 of which is adapted for receiving and axially supporting therein the rear portion 26 of the fiber mounting means 16. The rear portion 44 of the member 20 is adapted for receiving and axially supporting the center portion 40 of the rear strain relief member. As noted above, the reduced diameter center portion 46 cooperates with the ribbed portion 36 of the rear strain relief member for receiving and anchoring therebetween the strain relief fibers of an inserted cable.

Finally, a resilient member 22 such as an elastomeric ring, is adapted to fit between the optical fiber mounting means 16 and the front end of the front strain relief member 20 for allowing limited rearward axial movement of the mounting means 16. Preferably, that member is an elastomeric ring adapted to fit closely onto the rear projection 26; the fiber mounting means and the elastomeric ring then being supplied as a single element. However, it may similarly be provided as a front projecting component within the front strain relief member 20, or similarly, as the totally separate element shown in FIG. 1.

Once the strain relief assembly 14 is assembled as described hereinbelow, the assembly is adapted to be inserted within the housing 12 and to be locked in place via a rearmost threaded portion 48. The front portion of the housing 50 includes mating means such as a captive cap 50 having internal threads 52 for coupling the housing to an appropriate complementary member. As noted above, the housing further includes a front opening 30 having a wall against which the flange 28 may be pressed, upon mating of the threaded portions 38 and 48 together. Upon so mating, the remaining outer peripheral portions of the completed strain relief assembly thereby become axially centered within the cavity of the housing 12.

Also, as shown in FIG. 1, a particularly preferred complementary member is a fiber alignment assembly shown generally as 54, which assembly includes an enclosure 56 having a cylindrical cavity therein, a fiber guiding means 60 adapted to be positioned within the cavity of the member 56, and an opposite end plate 58 adapted to be press fitted onto the member 56 to thereby permanently anchor the fiber guiding means 60 within the cavity. The enclosure 56 preferably has an external threaded portion 62 adapted to mate with the internally threaded portion 52 of the mating means of the enclosure 12, and further has an axial opening 64 at one end, opposite of which is a like axial opening 66 in the end plate 58. A tubular member, such as element 24, may thus be inserted into either of the openings 64 or 66. The fiber guiding means 60 may further be seen in FIG. 1 to include at least three elongated members 68, 70 and 72, which members are disposed within the enclosure in a side by side array parallel to each other with the longitudinal peripheral surface portions of the adjacent members in contact with each other, thus forming a cusp-shaped interstitial channel therebetween, the channel being generally aligned with the axially positioned openings 64 and 66. The elongated members are each shaped with generally hemispherical ends to form entrance zones of gradually decreasing cross-section for guiding tubular members inserted through the respective openings 64 and 66 into the interstitial channel. The fiber guiding means also includes a resilient band 74 about the elongated members for biasing the members toward the common axis therebetween, and for allowing for a slight radial expansion of the interstitial channel upon receipt of tubular members, such as member 24, into the channel. Accordingly, when tubular members are received into the openings 64 and 66, the members become precisely laterally aligned along the axis, and optical fibers anchored within the tubular members become optically coupled together. The fiber alignment assembly may preferably be formed from machined brass; however, it is also contemplated that the enclosure and plate can be made of injection molded thermoplastic materials thereby enabling the members to be adhesively bonded rather than being press fitted as would preferably be the case with a machined brass construction. The elongated members 68, 70, and 72 are desirably solid steel rods, the ends of which are machined into a generally hemispherical configuration. However, those members may also be injection molded from a durable thermoplastic material, or the like. Finally, the elastomeric band 74 may preferably be a conventional rubber band or may also be formed of unvulcanized rubber tape wrapped tightly about the elongated members. Analogous constructional variations for the members as described herein above will be readily apparent to those skilled in the art.

It will be recognized that the combined operation of the strain relief assembly is to allow limited movement of a secured optical fiber while preventing forces applied to the connector from being applied to the optical fiber contained therein. Thus, the resilient ring 22 allows limited axial rearward movement of the fiber mounting means 16 to prevent undue strain on an inserted optical fiber, such as may occur upon contact of the mounting means with a similar member within a complementary member. Likewise, the anchoring of the outer jacket within the rear strain relief member 18 and the anchoring of the strain relief fibers between the rear and front strain relief members allows external forces to be transferred to the assembly and thus prevents such strain from being coupled to the optical fiber. To further enable the connector to be used by relatively inexperienced personnel, in field installations, the front and rear strain relief members 18 and 20 desirably include interlocking connecting detent means for providing a positive indication when the members are fully engaged with strain relief fibers of an optical fiber cable received and anchored therebetween. Thus, for example, as shown in FIG. 1, when the ribbed peripheral portion 36 of the rear strain relief member 18 is positioned relative to the center portion 46 of the front strain relief member, and those members are forced together, with the strain relief fibers of an optical cable between, such as by forcing the two members 18 and 20 together with an appropriately modified pliers, the two members both physically snap together and produce a distinct audible click, thus providing a positive indication of when the members are fully engaged.

It should further be pointed out that the coupling means 50 of the housing 12 may, as shown in FIG. 1, be a captive threaded cap, or may similarly be any commonly utilized connector mechanism, such as a bayonet fitting or the like. In such a case, it is readily apparent that the cooperating assembly, such as the fiber alignment assembly 54, will be modified to provide appropriate matching connecting means. In a further embodiment, it is preferred that the cavity within the alignment assembly 54 be somewhat larger than the outer circle defined by the outer dimension of the elongated members such that the subassembly formed by the elongated members and the elastomeric band thereabout is allowed to shift off axis somewhat so as to appropriately align optical fibers upon the insertion therein. Further, the fiber alignment assembly desirably includes a substantially transparent, highly viscous liquid, such as a light weight oil, within the interstitial channel. Such an oil is selected to have substantially the same index of refraction as that of an optical fiber contained therein, such that reflections at the connecting interface are minimized. It is particularly desirable that the elongated members 68, 70 and 72 within the assembly 54 have a circular cross-section of substantially the same diameter, and that the interstitial channel defined within the elongated members have an inscribed circular cross-section slightly smaller in diameter than that of the tubular member 24 which is to be received therein. In such an embodiment, the tubular member will thus be releasably anchored within the channel.

The connector shown in the exploded view in FIG. 1 is further set forth in FIG. 2 in an assembled form, together with an optical fiber cable 76 anchored therein. In FIG. 2 it may be seen that a preferred form of such a cable includes an outer jacket 78, a braid of fine, strain relief fibers 80, an inner, relatively stiff, tubular member for protecting the optical fiber, and finally, the innermost optical fiber 84. It may further be seen that the rear strain relief member 18 has a stepped-down, inner bore allowing the outer jacket 78 of the cable to be secured approximately half way through that member and thereafter allowing the remaining elements of the optical fiber cable to extend through the front portion of the rear strain relief member 18. Upon insertion into the front strain relief member 20, it is there further seen that the strain relief fibers 80 are anchored between the ribs on the periphery of the front portion 36 of the rear strain relief member and the internal bore 46 of the front strain relief member 20. The manner in which the tubular extension 24 into which the optical fiber 84 is received and anchored is engaged within the interstitial channel between the elongated members (68 and 70 of which are shown in FIG. 2) is also more clearly there shown. It may further be noted that the rear portion 26 of the fiber mounting means 16, which is adapted to be received within the front portion 42 of the front strain relief member, is provided with an internal bore appreciably larger in diameter than that of the optical fiber 84 to allow for a slight deflection of the fiber, thereby minimizing strain placed thereon as respective members of connectors are coupled together.

The connector is desirably utilized with a "loose tube" optical fiber such as type 226001, fiber optical cable manufactured by Belden Cables, Inc. For optimum results, the following tools and materials are preferably provided: wire stripper, razor blade, scissor, a solvent such as methyl ethyl ketone (MEK), cotton pads (for soaking), crimping tool, an instant adhesive such as a cyanoacrylate, a scribe for the optical fiber, water, alcohol, and cotton swabs.

Pursuant to the present invention, a connector of the present invention may then be conveniently assembled on the end of such a cable as follows:

Using a wire stripper, approximately 4 centimeters of the outer jacket should be removed from the optical fiber cable. The strain relief fiber braid, typically formed of Kelvar Brand fibers, proprietary high strength aromatic polyamide fibers available from DuPont, may then be unraveled, after which the inner jacket should be scored approximately 3 centimeters from the end, and broken away, exposing the optical fiber.

A buffer coating applied over the optical fiber may next be removed by soaking the exposed optical fiber in MEK for approximately three to five minutes. This soaking operation may conveniently be done by fabricating a simple jig within which the optical fiber may be secured while the end is held immersed in the MEK solution.

The unbraided strain relief fibers may next be bundled off to one side of the optical fiber and those fibers, together with the inner sleeve and exposed optical fiber, threaded through the opening in the rear strain relief member. The rear strain relief member is then pushed onto the outer jacket until the outer jacket is firmly secured therein. Again pulling the fibers to one side, away from the optical fiber, the protruding ends may be cut off approximately one centimeter long.

The front strain relief member may next be inserted onto the front end of the rear strain relief member, while simultaneously folding the strain relief fibers back over the rear strain relief member. The two strain relief members are then snapped into place using a crimping tool such as a modified slip-joint pliers to firmly secure the two members together.

The fiber mounting means may next be assembled onto the exposed fiber end. In an embodiment wherein a small amount of hot melt adhesive is preloaded within the tubular extension of the fiber mounting means, that means may be placed in a heatable jig to heat the adhesive into a molten state such that the fiber may be pushed through the mounting means until a short length of fiber extends out the far end. In the event that preinjected adhesive is not present, a small amount of a cyanoacrylate adhesive may be placed on the outer end of the fiber. The adhesive may then be allowed to set, thereby permanently anchoring the fiber within that mounting means.

Having thus completed the strain relief assembly, that assembly may be inserted into the connector housing by screwing the respective members together.

The optical fiber protruding beyond the end of the tubular extension of the fiber mounting means may next be scribed and broken off as close to the tubular extension as possible. The exposed end of the fiber may then be polished as described in U.S. Pat. No. 4,148,554 (Magnuson et al). As there set forth, the assemble connector may be mounted in an appropriate fixture adapted to position the end perpendicular to a diamond lap grinding surface. The surface of such a diamond lap is preferably wet, and the fixture lowered onto the surface until the exposed optical fiber is in contact with the rotating lap surface. As the optical fiber is ground away, the fixture should be lowered until contact with the tubular extension is made. At that point, the fixture is desirably moved back and forth across the lap surface to both grind and polish the combined members. After about 30 seconds of grinding, with very light pressure, the surface should be sufficiently ground to proceed to the polishing operation. At that time, the grinding lap should be removed and a polishing lap inserted in its place. The surface of the polishing lap should then be wet and the exposed end of the tubular extension and fiber stroked across the rotating polishing lap surface for approximately another 30 seconds. The connector may then be removed from the mounting jig, and cleaned using alcohol and a cotton swab. The thus ground and polished end within the connector is now available for subsequent connections. As so fabricated, a recess is produced in the polished optical fiber within the tubular extension, thus protecting the delicate optical fiber glass from damage such as may occur from mechanical contact during subsequent connecting operations. Similarly, the protection supplied to the optical fiber by the tubular extension results in a connector whose performance does not change with use.

It should be understood that the above-described connector and associated method, although found to be particularly useful in joining or splicing associated optical fiber cables together, are not intended to be limited thereby and may similarly be advantageously employed to join or splice optical fiber cables to associated electronic-optical interface modules. Thus, it must be understood that it is possible without going beyond the scope of the invention to employ a number of different variants, including different housing connecting means such as bayonet connectors and the like of different materials and construction and the like without departing from the spirit and scope of the present invention.

We claim:

1. A connector adapted for coupling an optical fiber cable which includes an outer jacket, a plurality of strain relief fibers, and an innermost optical fiber, said connector comprising a housing having a generally cylindrical cavity including front and rear openings and a strain relief assembly adapted to be received into said rear opening and to be secured thereat such that a portion of said strain relief assembly protrudes through the front opening of the housing, said strain relief assembly comprising:
   (a) an optical fiber mounting means including a rear portion adapted to receive the optical fiber and a tubular member containing a hot melt adhesive which upon heating allows the optical fiber to be inserted therethrough and upon cooling anchors the fiber therein, which tubular member enables the member and fiber anchored therein to abut a like member and fiber in another connector,
   (b) a rear strain relief member having an opening therethrough for receiving said optical fiber cable in the rear end thereof and including
   (i) means for anchoring the outer jacket of the cable within the rear portion of the opening, allowing the remainder of the cable to pass therethrough, and
   (ii) means on the outer surface for engaging said strain relief fibers of said cable,
   (c) a front strain relief member having an opening therethrough and including
   (i) means on the interior near the front end thereof for receiving and axially aligning therein said rear portion of said fiber mounting means,
   (ii) means on the interior near the rear end thereof for receiving and axially aligning a center portion of said rear strain relief member and
   (iii) interconnecting detent means cooperating with said engaging means of the rear strain relief member for receiving and anchoring therebetween said strain relief fibers of the cable and for positively coupling the two members together, while also providing a positive indication when the two members are fully engaged, and
   (d) a resilient member adapted to fit between the front end of said front strain relief member and said fiber mounting means to allow limited rearward movement of the mounting means,
   whereby the strain relief assembly allows limited rearward movement of the fiber mounting means to prevent undue strain on an optical fiber anchored therein such as may occur upon contact of the mounting means with a similar member upon connection of said connector and allows external forces applied to said outer jacket to be transferred to the assembly via the anchored strain relief fibers and prevents such strain from being coupled to said optical fiber.

2. A connector according to claim 1, wherein said tubular member of the fiber mounting means includes an axial bore therethrough for receiving and anchoring therein a said optical fiber such that one end of said fiber terminates substantially coplanar with one end of the tubular member, and having an axially concentric periphery, a front portion of which is adapted to mate with said front opening in said housing such that said one end of the tubular member extends therethrough, and a rear portion of which is adapted to axially mate with said front strain relief member.

3. A connector according to claim 1, wherein said front strain relief member includes a generally cylindrical body having an axially symmetric cavity therethrough, including a front opening for receiving and axially orienting the mating rear portion of said fiber mounting means, a center section for receiving and axially anchoring therein a front portion of said rear strain relief member with said strain relief fibers being secured therebetween, and a rear opening for receiving therethrough said front portion of said rear strain relief member, and having an axially concentric periphery adapted to mate with said cavity in the housing to maintain said members in axial alignment.

4. A connector according to claim 1, wherein said rear strain relief member includes a generally cylindrical body, and further including means for anchoring said outer jacket within said rear opening.

5. A connector according to claim 4, wherein said body of the rear strain relief member further includes means adapted for mating within the cavity of the housing to press said assembly toward the front opening in the housing.

6. A connector according to claim 1, wherein said housing further comprises means proximate to said front opening thereof for mating said connector to a complementary member.

7. A connector according to claim 6, wherein said mating means comprises a captive member adapted to thread onto a said complementary member.

8. A system adapted for connecting an optical fiber cable which includes an outer jacket, a plurality of strain relief members, and an innermost optical fiber to a fiber optic component, said system comprising a connector and an optical fiber alignment assembly, wherein said connector includes a housing having a generally cylindrical cavity extending along an axis and including front and rear openings concentric with said axis, and a strain relief assembly adapted to be received into said rear opening and to be secured thereat in axial alignment such that a portion of said strain relief assembly protrudes through the front opening of the housing, said strain relief assembly comprising:
   (a) an optical fiber mounting means including a rear portion adapted to receive the optical fiber and a tubular member containing a hot melt adhesive which upon heating allows the optical fiber to be inserted therethrough and upon cooling anchors the fiber therein, which tubular member enables the member and fiber anchored therein to axially abut a like member and fiber in another connector,
   (b) a rear strain relief member having a generally axially symmetric opening therethrough for receiving said optical fiber cable in the rear end thereof and including
   (i) means for anchoring the outer jacket of the cable within the rear portion of the opening, allowing the remainder of the cable to pass therethrough, and
   (ii) means of the outer surface for engaging said strain relief fibers of said cable,
   (c) a front strain relief member having an axially symmetric opening therethrough and including
   (i) means on the interior near the front end thereof for receiving and axially aligning therein said rear portion of said fiber mounting means, (ii) means on the interior near the rear end thereof for receiving and axially aligning a center portion of said rear strain relief member and (iii) interconnecting detent means on the interior thereof for cooperating with said engaging means in the rear strain relief member for receiving and anchoring therebetween said strain relief fibers of the cable and for positively coupling the two members together while also providing a positive indication when the two members are fully engaged, and (d) a resilient member adapted to fit between the front end of said front strain relief member and said fiber mounting means to allow limited rearward axial movement of the mounting means, and wherein said fiber alignment assembly includes (i) an enclosure adapted for mating with said connector housing, said enclosure having a cylindrical cavity therein and axial openings into the cavity at each end through which a said tubular member may be inserted, (ii) a fiber guiding means having at least three elongated members each of which has a cylindrical surface, said elongated members being disposed within said enclosure in a side-by-side array parallel to one another and to said axis with longitudinal peripheral surface portions of adjacent members in contact with each other to form a cusp-shaped interstital channel therebetween, said elongated members further having shaped ends forming respective entrance zones of gradually decreasing cross-section for steering a said tubular member into said channel, and (iii) a resilient band about the elongated members for biasing said members toward their common axis and for allowing slight radial expansion of said channel upon receipt of a said tubular member into the channel, such that tubular members received from each end are precisely laterally aligned along said axis, optical fibers anchored therein thereby being optically coupled, whereby the strain relief assembly allows limited axial rearward movement of the fiber mounting means to prevent undue strain on an optical fiber anchored therein such as may occur upon contact of the tubular member with a similar member within said channel and allows external forces applied to said outer jacket to be transferred to the assembly via the anchored strain relief fibers and prevents such strain from being coupled to said optical fiber.

9. A system according to claim 8, wherein said fiber alignment assembly further includes a substantially transparent, highly viscous liquid contained within said interstitial channel and having substantially the same index of refraction as that of an optical fiber to be optically coupled therein whereby reflection at the connecting interface is minimized.

10. A system according to claim 8, wherein each of said elongated members have a circular cross-section of substantially the same diameter, and wherein said interstitial channel thereby defines an inscribed circular cross-section having a slightly smaller diameter than that of a said tubular member to be received therein, a said received tubular member thus being releasably anchored within the channel.

11. A system according to claim 8, wherein said tubular members and said resilient band therearound have an effective outer diameter slightly less than that of said enclosure, thereby allowing said tubular members to slightly shift transversely to said axis to facilitate entry of a said tubular member into the interstitial channel.

12. A method adapted for optically connecting an optical fiber cable which includes an outer jacket, a plurality of strain relief fibers, and an innermost optical fiber, comprising (a) sequentially stripping back the components of said cable, leaving a portion of exposed optical fiber at one end, (b) inserting said sequentially stripped back members into a rear portion of a rear strain relief member and anchoring said outer jacket therein while the remaining components extend therethrough, (c) folding said strain relief fibers back over the outer periphery of said rear strain relief member and inserting that member into a front strain relief member having interconnecting detent means cooperating with matching detent means in the rear strain relief member, thereby snapping the relief members together and obtaining a positive indication when the two members become fully engaged, while also securing said strain relief fibers therebetween, (d) sliding a resilient member and an optical fiber mounting means having a tubular member containing a heated hot melt adhesive onto the exposed fiber end such that said resilient member bears against the front strain relief member and cooling said adhesive to anchor said fiber within said tubular member, and (e) securing the assembled cable, fiber mounting means and front and rear strain relief members within an outer housing such that said tubular member and optical fiber end thereof extend through an opening in the housing to allow optical coupling thereto.

13. A method according to claim 12 further comprising providing a fiber alignment assembly having means at each end along a common axis for receiving a said tubular member, and inserting said tubular member therein such that a similar member inserted into the opposite end of the alignment assembly would butt against the first inserted member, optical fibers anchored within each of the members thereby being optically coupled together.

14. A method according to claim 13, comprising providing in said fiber alignment assembly at least three mutually parallel and abutting cylindrical rods secured together by a resilient band, the inner dimension defined by the abutting rods being slightly less than the outer dimension of said tubular member, such that the insertion of said member between the rods causes the rods to slightly spread apart and retain the tubular members in axial alignment therein.

* * * * *